Oct. 4, 1966  R. LE ROY KEEFE, JR  3,276,930
TIRE FABRICATION PROCESS
Filed Dec. 30, 1965
2 Sheets-Sheet 1
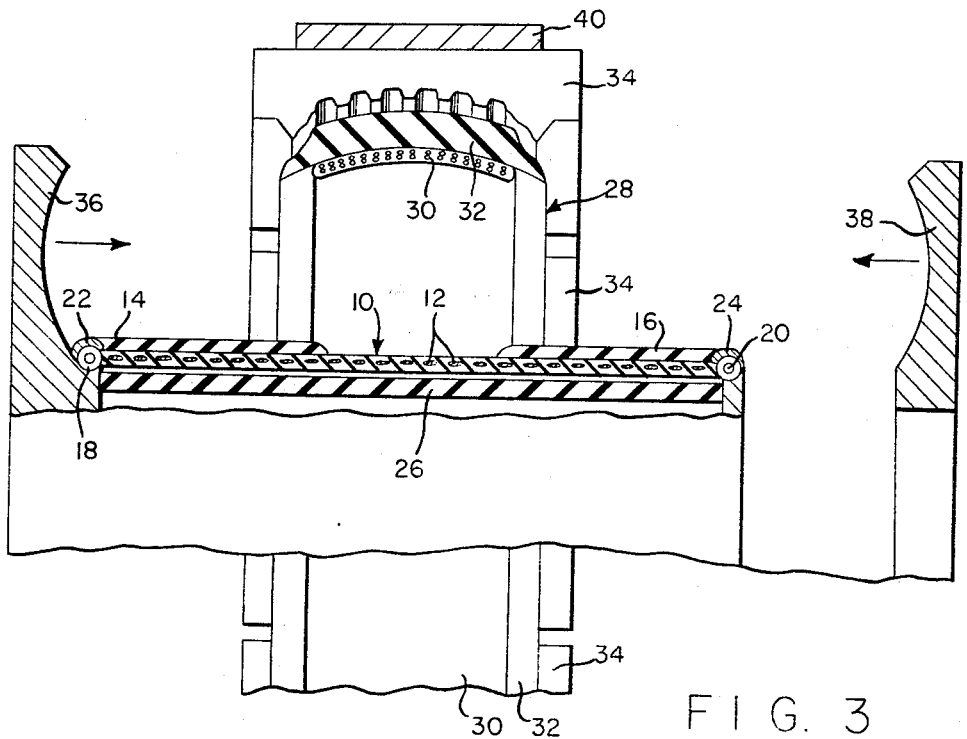
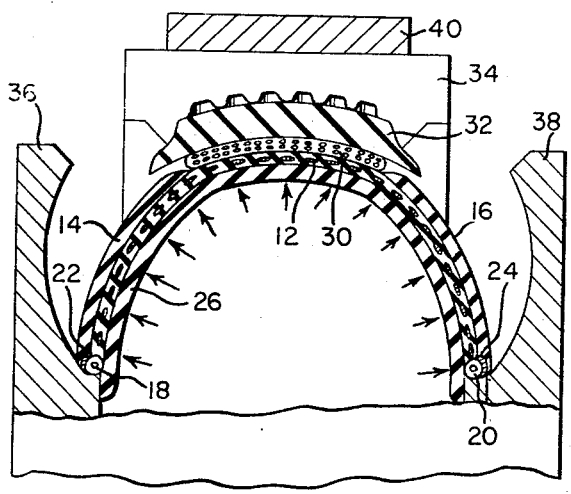
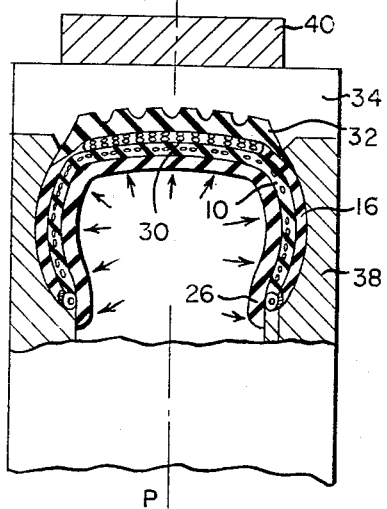

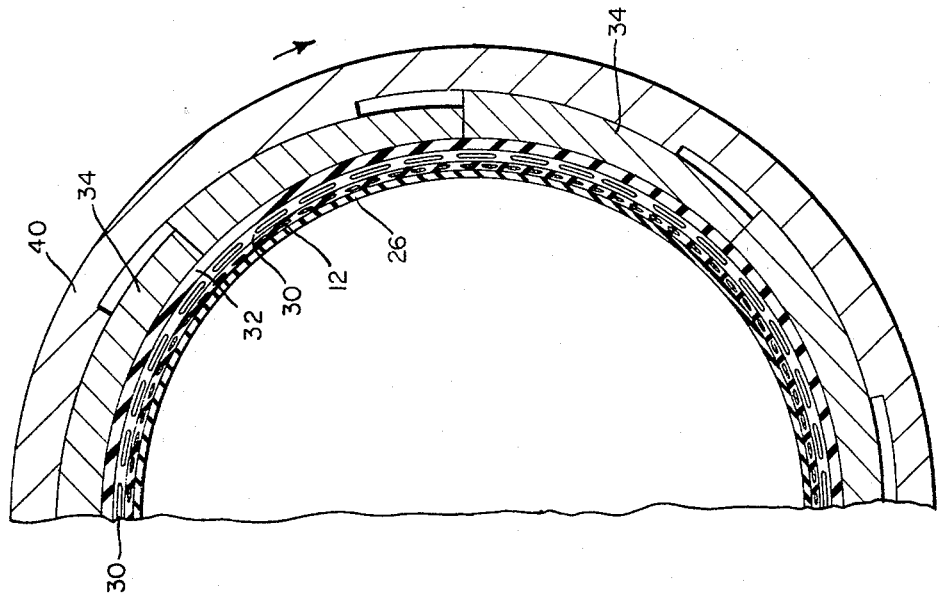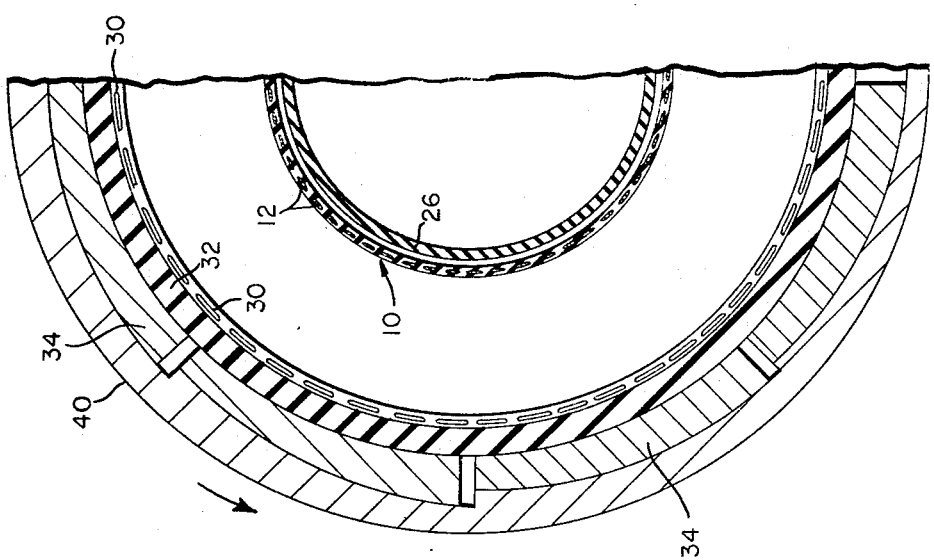

United States Patent Office 3,276,930
Patented Oct. 4, 1966

3,276,930
TIRE FABRICATION PROCESS
Robert Le Roy Keefe, Jr., Chadds Ford, Pa., assignor to E. I. du Pont de Nemours and Company, Wilmington, Del., a corporation of Delaware
Filed Dec. 30, 1965, Ser. No. 517,744
4 Claims. (Cl. 156—128)

This application is a continuation-in-part of my copending application bearing Serial No. 194,092, filed May 11, 1962, now abandoned. Both relate to the manufacture of pneumatic tires and, more particularly, to an improved process for constructing a belted tire.

In a conventional tire process, the cylindrical band expands and assumes a toric shape as the beads are brought together in a vulcanizing press. As it expands, there is a larger circumferential stretch in the outer peripheral portions known as the crown and upper wall regions than in the inner peripheral portions or lower wall regions. In the rhombus patterns formed by the plies of overlaid carcass cords, each rhombus axis which is parallel to the equatorial plane of the tire will stretch at the expense of the axis which is perpendicular to it. This stretching-contraction is known as pantagraphing and causes higher strains in the elastomer matrix surrounding the cords than is set up in the tire cords.

In a belted tire, i.e., a tire with a substantially inextensible cylindrical breaker, or cincture belt, mounted between the tread and the crown of the carcass, the cords of the carcass conventionally are radial, i.e., they lie in planes that are substantially perpendicular to the equatorial plane of the tire. However, the circumferentially extending cords of the belt are usually positioned at an angle of from 15° to 20° with the equatorial plane and accordingly form trellis-like patterns of the type noted above. At these low angles, a small amount of circumferential stretch is accompanied by pantographing and also by a relatively large contraction of the belt width. Such pantographing causes undesirable compression strains and buckling of the radial cords of the carcass and causes transfer of tread rubber from the shoulder toward the center of the tread, sometimes leaving air pockets at the edge of the belt.

When a belted tire has bias carcass cords, compression strains also occur on those bias cords because of the greater pantographing of the belt cords relative to the carcass cords. This special problem with pantographing causes many "rejects" in the manufacture of belted tires.

One effort to answer the need for a satisfactory process for making belted tires has been made by M. Vanzo et al. who described in U.S. Patents 2,814,330 and 2,814,331 a machine and a process for the first stage of building such a tire as is disclosed in U.S. Patent 2,982,328. In the Vanzo process, however, as in other conventional tire production processes, the several parts are stitched together in the form of a green tire ready for vulcanization. Stitching is a costly additional step which is necessary in belt tire manufacturing operations and is effective to prevent movement only in the immediate vicinity of the stitch line.

According to the process disclosed herein, composite carcass and tread members are formed separately. The carcass member includes tire sidewall portions and the tread member includes a reinforcement belt. After those preliminary steps have been accomplished, the two members are positioned in a vulcanizing press with the tread member surrounding but spaced from the carcass member. A first level of pressure is then applied interiorly of the carcass member to partially shape and move it outwardly into surface contact with the surrounding tread member. Then an increased level of radially directed pressure is applied uniformly to the interior of the carcass member, as well as to the outer periphery of the tread member, simultaneously with the application of sufficient heat to unite the members, form a tread pattern and shape a tire without changing the diameter of the reinforcement belt. At this point, a further increased level of pressure is applied interiorly of the tire while maintaining it at an elevated temperature for the duration of a vulcanizing cycle.

Various objectives and advantages of the process will become apparent in the following description wherein reference is made to the accompanying drawings in which:

FIGURE 1 is a fragmentary, longitudinal, sectional view of a modified press showing opening mold sidewall and tread sections, an expansible diaphragm and the two composite members from which a pneumatic tire is formed;

FIG. 2 is a similar view showing the resilient diaphragm partially expanded and the mold sections in an intermediate, partially closed position;

FIG. 3 is a similar view of the press after all sections have been closed, parts having been broken away and shown in section to reveal process details;

FIG. 4 is a fragmentary, transverse, sectional view taken on the equatorial plane and showing the arcuate mold sections in their partially closed position; and FIG. 5 is a similar view showing the arcuate mold sections in their closed positions.

Preliminarily, a composite annular tire carcass member 10 is built on a conventional tire-building drum (not shown) to include reinforcement cords 12, sidewalls 14, 16, beads 18, 20 and chafer strips 22, 24. As such, it can be fitted on an expansible annular diaphragm 26 which has been incorporated into the modified vulcanizing press shown in FIG. 1. Similarly, a composite annular belt-tread member 28 is assembled from belt and tread elements 30, 32 and built in the form of a hoop on a tire-building drum, with an outside diameter substantially equal to the maximum diameter of the tread grooves in the closed mold. First, the annular belt element is formed on the drum. Then the tread element 32 is aligned with and applied to the outer periphery of element 30. The latter may be either a one-ply breaker strip or a cincture belt of multiple plies, as illustrated. Belt-tread member 28 fits in the press mold within a plurality of arcuate mold tread sections 34 and between mold sidewall sections 36, 38, all of which have been shown in the open position in FIG. 1.

Mold sections 34, 36, 38 are heated in the usual manner. Sidewall sections 36, 38 are movable along a common center line to laterally open and close the mold cavity and the press is located so that this center line is horizontal, as illustrated. Section 38 is movable to a greater extent so that composite members 10, 28 may be positioned conveniently and accurately. The mold embodiment chosen for purposes of illustration has eight arcuate tread sections 34, each of which extends laterally to the shoulder area of a tire and moves radially between the open, partially closed and fully closed positions shown in FIGS. 1, 2 and 3, respectively. In the closed position, the interior surfaces of sections 34 form a continuous mold circumference corresponding to the outer periphery of a finished tire.

The process involves not only those preliminary steps which have been mentioned above but also the subsequent procedures involved in the direct fabrication of a finished, vulcanized tire from composite annular members 10, 28. After carcass member 10 has been positioned over and around diaphragm 26, belt-tread member 28 is located inside open sections 34 and the latter are partially closed to the position shown in FIG. 2, i.e., are moved inwardly sufficiently to hold member 28 but not sufficiently to cause any buckling or compression. At this stage, member 28 is coaxially aligned with and located centrally of carcass member 10. Sidewall section 38 is moved laterally to a position corresponding to that of section 36. Then a heated fluid under a pressure in the range of 5–40 p.s.i. is introduced into diaphragm 26. When this first level of pressure is applied interiorly of the diaphragm, it functions to expand carcass member 10 into contact with the inner surface of belt tread member 28 while sidewall sections 36, 38 are moved simultaneously toward the equatorial plane of the mold. As the tire is partially shaped in this manner, beads 18, 20 at all times remain substantially equidistant from the equatorial plane P—P (FIG. 3) and member 28 remains centered on member 10.

After fabrication has reached the stage shown in FIG. 2, mold sections 34, 36, 38 are all moved to their ultimate closed positions as the fluid pressure in diaphragm 26 is increased. These opposed pressures are radially directed uniformly to the interior of carcass member 10 and to the exterior of belt-tread member 28, thereby evenly compressing member 28 without changing its diameter, or causing buckling or reduction in the width of belt element 30 due to cord "pantographing." In this manner, the tire is shaped and a tread pattern is formed on the uncured tread elastomeric material without radially stretching or displacing the belt-tread member. The technique is advantageous for the additional reason that composite members 10, 28 are united in the press rather than by a preliminary stitching operation.

With all mold sections in their final closed positions (FIG. 3) and after formation of the tread pattern, the fluid in diaphragm 26 is raised to the final curing pressure of about 150 p.s.i. at a temperature of about 350° F. without danger of over-expansion or pantographing. Passenger tires are conventionally cured for about 17 minutes and truck tires for about 45 minutes.

The net circumferential expansion or contraction of the belt must be carefully controlled and limited to the range of from 0 to about 0.5% of the circumference of the green belt, and preferably is avoided altogether.

The fluid for expanding is preferably steam. During curing, either hot water, steam or inert gas may be used. Other factors involved in the curing operation are conventional, e.g., maintenance of pressures in the range of from about 100 to about 500 p.s.i., temperatures in the range from about 260° to about 390° F., and curing times from about 12 to about 120 minutes.

To accurately form the tire, members 10, 28 should be so located that their equatorial planes are substantially coincident. This is accomplished by having the sides of the arcuate tread mold sections 34 extend radially along the shoulder area of the tire a distance not less than the largest depth of the tread pattern but short of the point which locates the maximum tire section width.

After reducing diaphragm pressure, the pneumatic tire may be removed by opening the arcuate tread mold sections 34 and moving the two mold sidewalls 36, 38 back to the position shown in FIG. 1.

In FIGS. 4 and 5, sectional views in the equatorial plane further illustrate the manner in which process details are accomplished. These views correspond to the longitudinal sections in FIGS. 2 and 3 except that the diaphragm 26 has not yet been expanded in FIG. 4. The latter shows carcass member 10 containing cords 12 in position on annular diaphragm 26 and belt-tread member 28 in contact with the inner surface of arcuate tread sections 34. Sections 34 have been moved to their partially closed position by rotation of a ring 40, the inner surface of which is provided with eccentrically disposed steps bearing against oppositely disposed outer surfaces on sections 34. When the ring 40 is rotated further to the position shown in FIG. 5, tread sections 34 move to their closed positions. Simultaneously, diaphragm 26 is further pressurized to such an extent that radially directed pressures are applied uniformly on the inner and outer surfaces of the tire without changing the diameter of belt element 30.

If desired, the partially-cured tire may be inflated after it is removed from the press and allowed to complete its cure and to cool while inflated.

The cords for both the cincture belt and the carcass members may be of textile fibers such as cotton, flax, rayon, polyamide yarns, and polyester yarns, or of metal wires. These cords may be either extensible or substantially inextensible.

Carcass cords may be either radial, i.e., cords which lie substantially in planes radiating from the axis of rotation; or they may be at a bias, i.e., cords which lie at an acute angle to the equatorial plane of the tire.

Concurrent construction of the two tire members that go to make up the pneumatic tire, as well as elimination of the conventional stitching operations, make this process a more economic one than those currently in use and significantly reduces the number of rejected tires due to poor uniformity and improper balance. In the latter connection, it is the application of equal but opposite pressures during final mold closure which assures a minimum of residual stresses and strains as well as an even flow of elastomer into the tread pattern to produce a regularly shaped and properly balanced tire.

This process may be used in the fabrication of tires having breaker strips rather than cincture belts. The mold may have from six to twelve of the arcuate tread sections 34. Other modifications and adaptations of a similar nature may be made without departing from the inventive concept which accordingly is intended to be limited only by the scope of the appended claims.

Having thus described the invention, what is claimed as new and desired to be secured by Letters Patent is:

1. In a tire fabrication process including the preliminary steps of forming composite annular tread and carcass members, the steps of: positioning said members in a vulcanizing press with the tread member surrounding but spaced from the carcass member centrally thereof;
    applying a first level of pressure interiorly of said carcass member to partially shape and move it outwardly into surface contact with the interior of said tread member;
    applying an increased level of radially directed pressures uniformly to the interior of said carcass member and to the outer periphery of said tread member simultaneously with the application of sufficient heat to unite said members, to form a tread pattern on the outer periphery of said tread member while maintaining its original diameter and to shape the tire; and
    applying a further increased level of pressure interiorly of said tire while maintaining it at an elevated temperature for the duration of a vulcanizing cycle.

2. The process of claim 1 further comprising post-inflation of the tire after its removal from the press.

3. A tire fabrication process comprising the steps of: positioning a preassembled carcass member including tire sidewall portions on an expansible annular diaphragm in the mold of a vulcanizing press having sidewall sections relatively movable between open and closed positions as well as a plurality of arcuate tread sections radially movable between open and closed positions;

positioning a composite annular belt-tread member around said carcass member centrally thereof;

partially closing the tread sections until in contact with the belt-tread member;

expanding said diaphragm with pressurized heated fluid while partially closing the sidewall sections until the carcass member contacts the inner surface of said belt-tread member;

increasing the pressure in said diaphragm while completing closure of the mold, thereby evenly compressing said members while forming a tread pattern and shaping a tire; and further increasing the fluid pressure in said diaphragm while maintaining the tire at an elevated temperature for the duration of a vulcanizing cycle.

4. The process of claim 3 further comprising post-inflation of the tire after its removal from the press.

References Cited by the Examiner

UNITED STATES PATENTS

| | | | |
|---|---|---|---|
| 2,497,226 | 2/1950 | McNeill | 156—125 |
| 2,672,914 | 3/1954 | Weigold et al. | 156—125 |
| 2,686,554 | 8/1954 | Hinman | 156—127 |
| 2,814,331 | 11/1957 | Vanzo et al. | 156—128 |
| 2,948,921 | 8/1960 | Laube et al. | |
| 3,047,450 | 7/1962 | Drakeford et al. | 156—128 |

EARL M. BERGERT, *Primary Examiner.*

H. ANSHER, *Assistant Examiner.*